United States Patent
Meyer et al.

(10) Patent No.: US 10,689,588 B2
(45) Date of Patent: Jun. 23, 2020

(54) PROCESS FOR OBTAINING WAX FRACTIONS FROM A FEED WAX

(71) Applicant: Sasol Wax GmbH, Hamburg (DE)

(72) Inventors: Gernot Meyer, Rosengarten (DE); Ingo Behrmann, Stellau-Barsbuttel (DE)

(73) Assignee: Sasol Wax GmbH, Hamburg (DE)

( * ) Notice: Subject to any disclaimer, the term of this patent is extended or adjusted under 35 U.S.C. 154(b) by 0 days.

(21) Appl. No.: 15/738,960

(22) PCT Filed: Jun. 23, 2016

(86) PCT No.: PCT/EP2016/064620
§ 371 (c)(1),
(2) Date: Dec. 21, 2017

(87) PCT Pub. No.: WO2016/207319
PCT Pub. Date: Dec. 29, 2016

(65) Prior Publication Data
US 2018/0171248 A1     Jun. 21, 2018

(30) Foreign Application Priority Data
Jun. 26, 2015   (EP) ..................................... 15174066

(51) Int. Cl.
| C10G 73/36 | (2006.01) |
| B01D 9/00 | (2006.01) |
| C10G 31/06 | (2006.01) |
| C10G 2/00 | (2006.01) |
| C08L 91/08 | (2006.01) |

(52) U.S. Cl.
CPC ............. *C10G 73/36* (2013.01); *B01D 9/004* (2013.01); *C08L 91/08* (2013.01); *C10G 2/00* (2013.01); *C10G 31/06* (2013.01); C10G 2300/1022 (2013.01); C10G 2300/1085 (2013.01)

(58) Field of Classification Search
CPC .......... C10G 73/36; C10G 31/06; C10G 2/00; C10G 2300/1085; C10G 2300/1022; C08L 91/08; B01D 9/004
See application file for complete search history.

(56) References Cited

U.S. PATENT DOCUMENTS

| 2,099,683 A | 11/1937 | Ferris et al. .................... 208/32 |
| 4,013,541 A | 3/1977 | Irwin et al. .................... 208/32 |
| 5,015,357 A * | 5/1991 | Rueff ..................... C10G 73/36 208/30 |
| 6,074,548 A | 6/2000 | Matzat et al. .................. 208/30 |
| 6,145,340 A * | 11/2000 | Stepanski ............ B01D 9/0013 62/532 |

FOREIGN PATENT DOCUMENTS

| GB | 687235 A | 2/1953 |
| WO | WO 2014020535 A2 | 2/2014 |

OTHER PUBLICATIONS

International Search Report and Written Opinion for PCT/EP2016/064620, dated Sep. 23, 2016.
"Waxes", *Ullmann's Encyclopedia of Industrial Chemistry*, 6th Edition, vol. 39, pp. 135-197, 2003.

* cited by examiner

*Primary Examiner* — Randy Boyer
*Assistant Examiner* — Juan C Valencia
(74) *Attorney, Agent, or Firm* — Norton Rose Fulbright US LLP

(57) ABSTRACT

A process for obtaining a wax fraction from a feed wax, the process comprising: (a) providing a molten feed wax in a container; (b) solidifying the feed wax by cooling; (c) increasing the temperature of the feed wax to a temperature at which a first fraction of the feed wax melts, said first fraction having a congealing point which is lower than the congealing point of the feed wax; (d) recovering the first fraction of the feed wax; (e) increasing the temperature of the remaining feed wax to a temperature at which a further fraction of the feed wax melts; and (f) recovering the further fraction of the feed wax. The feed wax comprises at least 75 wt.-% of linear alkanes and each recovered fraction comprises at least 19 wt.-% of the feed wax.

27 Claims, No Drawings

PROCESS FOR OBTAINING WAX FRACTIONS FROM A FEED WAX

This application is a national phase application under 35 U.S.C. § 371 of International Application No. PCT/EP2016/064620 filed Jun. 23, 2016, which claims the benefit of priority of European Patent Application No. 15174066.9 filed Jun. 26, 2015. The contents of each of the above-referenced applications are incorporated into the present application by reference.

The present invention concerns a process for producing hydrocarbon waxes having defined properties.

Waxes are a class of compounds of great chemical diversity but with common properties. Waxes do usually not consist of a single chemical compound, but are often very complex mixtures. According to the definition by the Deutsche Gesellschaft für Fettwissenschaft (DGF, German Association for Fat Science) waxes must have (1) a drop melting point above 40° C.; (2) their melt viscosity must not exceed 10,000 mPas at 10° C. above the drop point; (3) they should be polishable under slight pressure and have a strongly temperature-dependent consistency and solubility; (4) at 20° C. they must be kneadable or hard to brittle, coarse to finely crystalline, transparent to opaque, but not glassy, highly viscous or liquid; (5) above 40° C. they should melt without decomposition; (6) above the melting point the viscosity should exhibit a strongly negative temperature dependence and the liquid should not tend to stringiness; (7) waxes should normally melt between 50 and 90° C. (in exceptional cases up to 200° C.); (8) waxes generally burn with a sooting flame after ignition and (9) waxes form pastes or gels and are poor conductors of heat and electricity (see Ullmann's Encyclopedia of Industrial Chemistry, $6^{th}$ Edition, Volume 39, Waxes).

Waxes can be classified according to various criteria such as e.g. their origin. Here, waxes can be divided into two main groups: natural and synthetic waxes. Natural waxes can further be divided into fossil waxes (e.g. petroleum waxes) and nonfossil waxes (e.g. animal and vegetable waxes). Petroleum waxes are divided into macrocrystalline waxes (paraffin waxes) and microcrystalline waxes (microwaxes). Synthetic waxes can be divided into partially synthetic waxes (e.g. amide waxes) and fully synthetic waxes (e.g. polyolefin- and Fischer-Tropsch waxes).

Macrocrystalline paraffin waxes originating from petroleum sources and fully synthetic waxes consist predominantly of a mixture of n-alkanes and may therefore also be defined as hydro-carbon waxes. Iso-alkanes are present in a much lower proportion, together with a small fraction of cyclo-alkanes in case of petroleum based waxes.

Paraffin waxes are obtained from light and middle lubricating oil cuts of vacuum distillation. Raw or crude paraffin waxes, also known as slack waxes, contain a certain amount of the lubricating oil cuts from which they originate such as short-chained alkanes and other components which are liquid under normal conditions ("oil content") and which are removed during refining of the wax in order to obtain harder, semi- or fully-refined paraffin waxes with a low oil-content. Many different grades and qualities of paraffin waxes are known. Refining of paraffin wax may include vacuum distillation, dearomatization and dewaxing of lube oil cuts and subsequently the deoiling of slack wax, hydrotreating and/or bleaching of raw paraffin wax. Deoiling can be achieved by different methods such as solvent deoiling, static crystallization, or sweat deoiling. The oil fractions removed from the wax during deoiling of slack waxes are sometimes known as foot oils. Microcrystalline waxes are characterized by a high content of strongly branched isoparaffins and napththenes and they are more reactive than paraffin waxes.

Sweat deoiling is the most traditional deoiling process, developed in the $19^{th}$ century. It is based on the observation that crude solid paraffin wax sweats out oily substances during heating. The quality of the remaining paraffin wax is increased because it contains less oil than the feed. This principle was used soon in small plants for deoiling crude waxes. Upon heating the crude wax separates off an oily material (foot oil) which runs down to the bottom of the sweating chamber. The material collected in the middle of the process is recycled in the next processing step because its quality is comparable to the quality of the feed. After sweating off the desired percentage of oily substances the valve at the bottom of the chamber is closed. At the end of the process the wax remaining in the chamber is melted and drawn off. The product wax obtained by the deoiling process is usually further processed by hydrofinishing processes.

Sweat deoiling is a technically simple and robust process which does not require the addition of solvent. However, there are serious disadvantages to this process such as the need to use a batch process, the long period of time during which the wax cake has to be sweated and the lack of flexibility with respect to quality fluctuations of the crude feed wax which means that only slack waxes with specific properties can be processed. The process is only applicable to waxes having a relatively wide boiling range and to slack waxes with a viscosity (at 100° C.) of 2.5-5 $mm^2$/s. Due to the higher content of branched alkanes heavy slack waxes with a higher viscosity exhibit a microcrystalline crystallization behavior which hampers the separation of the oil. The products are especially useful for applications which necessitate good drawing performance.

GB 687235 A relates to the treatment of crude paraffin waxes by sweating off undesirable components such as oils and isoparaffins. The crude waxes have an initial oil-content of more than 5% and are deoiled to a lower oil- and isoparaffin content by passing a warm gas through the crude paraffin wax. The deoiled wax can be subjected to one of the usual refining treatments with acid, lime and Fullers' earth.

U.S. Pat. No. 2,099,683 relates to the separation of substantially oil-free paraffin waxes into 3 to 6 fractions by sweating. The size of the wax fractions ranges from 3.2 to 75.3%. The processing of Fischer-Tropsch waxes and fractional crystallization are not disclosed.

U.S. Pat. No. 6,074,548 discloses a process for obtaining paraffins or paraffin fractions from a paraffin-containing melt, wherein the melt is cooled to a temperature below the melting temperature of the paraffin fractions to be obtained and liquid low-melting fractions and oils are separated from the higher-melting paraffin fractions solidified by cooling, and are discharged. Since the low-melting fractions and oils remain liquid, less energy is said to be required in the cooling phase and the subsequent sweating phase than in sweating deoiling, in which all the fractions and oils are first solidified, after which the resulting block has to be re-heated to the sweating temperature.

WO 2014/020535 relates to a method of refining wax which comprises the steps of hydrogenating a feed wax which has an MEK-solubility oil content of more than 0.5 wt.-% followed by deoiling the hydrogenated wax. It was found that by a process in which the feed wax is first hydrogenated and then deoiled oxygenates which are otherwise difficult to deoil can be readily removed during deoiling.

Today the majority of the waxes of all types produced worldwide are waxes which are obtained from crude petroleum. Commercially available deoiled and refined waxes are classified according to congealing point range (gradation) and oil content. The quality specifications of paraffin waxes are determined mainly by their uses. Paraffin waxes are used in very different fields of industry and standard specifications have been established for waxes that come in contact with foods, for waxes in cosmetic and pharmaceutical preparations and for waxes for other industrial applications. The waxes are differentiated in terms of physical characteristics, chemical composition, purity requirements, and application properties.

In the oil industry slack waxes are often considered as inconvenient side products and modern processes for the processing of crude petroleum have been optimised with respect to lubrication oil yield. Thus many Group I base oil refineries which are the classical source of slack waxes have been closed or will be closed in the near future. As a consequence of this the supply of crude slack waxes is decreasing and the chemical composition of slack waxes is changing. Therefore there is a need of finding reliable alternative sources for paraffin waxes which provide a reliable supply of waxes of constant quality which are suitable for various applications.

An important group of fully synthetics waxes are Fischer-Tropsch waxes. Hydrocarbon waxes originating from the Fischer-Tropsch (FT) process are formed by catalytic reaction of synthesis gas (CO and $H_2$) and contain predominantly n-alkanes, a low amount of iso-alkanes and are basically free of cyclo-alkanes and impurities like e.g. sulfur or nitrogen. Crude Fischer-Tropsch waxes can be further processed by fractional distillation, hydrotreating and/or deoiling. FT-waxes have a high crystalline portion and differ from petroleum based waxes in containing predominately n-alkanes. They are obtainable with longer chains and higher melting points than paraffin waxes (FT-hard waxes). All FT-waxes contain contaminations of olefins and oxidized hydrocarbons. Therefore, synthetic waxes which meet all specifications of paraffin waxes are not readily available.

It is an object of the present invention to provide a process for producing waxes which are suitable for replacing commercial paraffin waxes. It is a further object to provide a process of producing wax which is not dependant on the use of crude petroleum as a source. It is still a further object of the invention to provide a process which is energy-saving and which avoids thermal stress of the starting materials and products.

According to the present invention these objects are achieved by a process for obtaining wax fractions from a feed wax, which comprises the following steps:
 (a) providing a molten feed wax in a container;
 (b) solidifying the feed wax by cooling the feed wax to a temperature below its congealing point;
 (c) increasing the temperature of the feed wax to a temperature at which a first fraction of the feed wax melts;
 (d) recovering the first fraction of the feed wax from the container, said first fraction having a congealing point that is lower than the congealing point of the feed wax;
 (e) increasing the temperature of the remaining feed wax to a temperature at which a further fraction of the feed wax melts; and
 (f) recovering the further fraction of the feed wax from the container.

The process is characterized in that the feed wax which is used as the starting material in step (a) (initial feed wax) comprises at least 75 wt.-%, preferably 80 wt.-% and more preferably 90 wt.-% of linear alkanes.

The first fraction recovered in step (d) represents 19 to 81 wt.-%, preferably 33 to 81 wt.-% and more preferably 45 to 81 wt.-% relative to the initial feed wax; the further fraction(s) recovered in step (f) represent(s) 20 to 100 wt.-%, preferably 25 to 100 wt.-% and more preferably 33 to 100 wt.-% relative to the remaining feed wax of step (e).

By the process of the present invention the feed wax is separated into two or more, preferably 2 to 5 individual fractions. If the preparation of more than two wax fractions is desired the temperature in step (e) is increased to a temperature which is below the melting temperature of the remaining feed wax and steps (e) and (f) are repeated one or more times depending upon the desired number of fractions. Preferably steps (e) and (f) are repeated 1 to 3 times. In the final repetition of step (e) the temperature is preferably raised above the melting temperature of the remaining feed wax such that the remaining wax is melted completely and can be withdrawn from the container. The first fraction and the further fraction(s) are preferably recovered in the form of a molten wax.

The size of the fraction(s) recovered in the process of the invention is determined by the desired number of fractions. For instance, if the first fraction recovered in step (d) comprises 20 wt.-% of the initial feed wax, the remaining 80 wt.-% of the initial feed wax will proceed to step (e) and in step (f) 20 to 100 wt.-% of the remaining feed wax can be recovered. If the initial feed wax is to be separated into two fractions, 100 wt.-% of the remaining feed wax (in this instance 80 wt.-% of the initial feed wax) are recovered in step (f).

If more than two fractions are desired, less than 100 wt.-% of the remaining feed wax are recovered. If, for instance, 20 wt.-% of the remaining feed wax are recovered in step (f) as a second fraction, 80 wt.-% of the remaining feed wax will be present after step (f). Since the feed wax remaining after step (d) comprises 80 wt.-% of the initial feed wax, the second fraction recovered in step (f) comprises 16 wt.-% of the initial feed wax (20 wt.-% of 80 wt.-%) and the fraction remaining after step (f) comprises 64 wt.-% of the initial feed wax. The remaining 64 wt.-% can be recovered by repeating steps (e) and (f), i.e. by further increasing the temperature (step e) and recovering 20 to 100 wt.-% of the remaining feed wax. If three fractions are desired 100 wt.-% of the remaining feed wax are recovered at this stage, and if more than three fractions are desired steps (e) and (f) have to be repeated one or more times until the desired number of fractions has been isolated.

Due to the removal of wax fractions having a low congealing point, the congealing point of the remaining feed wax increases during the process of the invention. The first fraction removed in step (d) usually has a congealing point which is below the congealing point of the initial feed wax and the last fraction a congealing point which is higher than the congealing point of the initial feed wax. The optional intermediate fractions have congealing points which are between the congealing points of the first and the last fraction and may be higher or lower than the congealing point of the initial feed wax.

According to a preferred embodiment of the invention the percentages of the wax fractions are selected such that no wax fraction is smaller than 19 wt.-% and in particular smaller than 20 wt.-% of the initial feed wax. Preferably the initial feed wax is separated into 2 to 5 fractions.

In case of 5 fractions, each fraction preferably comprises 19 to 24 wt.-% of the initial feed wax, more preferably 20 wt.-% of the initial feed wax, i.e. in step (d) e.g. 20 wt.-% of the initial feed wax are recovered (first fraction) and 80 wt.-% of the initial feed wax proceed to step (e). In step (f) 25 wt.-% of the remaining feed wax are recovered as a second fraction, i.e. the second fraction also comprises 20 wt.-% of the initial feed wax. After step (f) 60 wt.-% of the initial feed wax remain and are subjected to the first repetition of steps (e) and (f). In the first repetition 33.3 wt.-% of the remaining feed wax are recovered in step (f') as a third fraction. Again, the third fraction amounts to 20 wt.-% of the initial feed wax. After the first repetition of steps (e) and (f) 40 wt.-% of the initial feed wax remain and are subjected to a second repetition of steps (e) and (f). In the second repetition 50 wt.-% of the remaining feed wax are recovered in step (f'') which amount to 20 wt.-% of the initial feed. After the second repetition 20 wt.-% of the initial feed wax remain and will be recovered in the final repetition of steps (e) and (f).

In case of 4 fractions each fraction preferably comprises from 19 to 40 wt.-% of the initial feed wax, more preferably 20 to 40 wt.-% and most preferably about 25 wt.-%. In case of 3 fractions, each fraction preferably comprises from 19 to 60 wt.-%, more preferably 20 to 60 wt.-% and most preferably about 33 wt.-% of the initial feed wax, and in case of 2 fractions each fraction preferably comprises from 19 to 80 wt.-%, more preferably from 20 to 80 wt.-%, even more preferably 40 to 60 wt.-% and most preferably about 50 wt.-% of the initial feed wax. In any case the sum of the fractions must be 100 wt.-%. For instance, if the initial feed wax is separated into four fractions three of these fractions can comprise e.g. 20 wt.-% of the initial feed wax and one fraction 40 wt.-% of the initial feed wax.

If not stated otherwise the term "congealing point" as used herein refers to the congealing point determined according to DIN ISO 2207. The term "wax" used herein in accordance with the above DGF definition.

It was surprisingly found that feed waxes with a high content of n-alkanes can be separated into discrete fractions (product waxes) having similar characteristics as refined and deoiled paraffin waxes obtained from petroleum.

According to the present invention separation of a feed wax is achieved by fractional crystallization. Fractional crystallization herein means a process for the separation of wax fractions by solidifying a feed wax in a container which is preferably equipped with one or more heat exchangers, e.g. heat exchanger plates, and selectively releasing fractions from the feed wax by heating the feed wax to a temperature above the melting temperature of the fraction to be obtained.

During fractional crystallization the feed wax is first slowly cooled to a temperature slightly below the congealing point of the feed wax. The heat exchanging plates in the crystallization vessel can be used for this cooling process. Afterwards the wax body in the crystallizer is heated slowly e.g. by the heat exchanger.

Preferably the temperature of the feed wax is increased at a rate of from 0.5 to 3° C. per hour, preferably 1.5 to 2.5° C. per hour. Preferably the temperature is increased continuously throughout the process, i.e. the fractional crystallization according to the invention preferably comprises only a single melting operation wherein the temperature profile (heating) is only passed through once. That is, starting at step (c) the temperature is continuously increased until the final recovering step (f).

The fractions obtained by the process according to the invention are wax fractions with a congealing point preferably of 45 to 80° C., more preferably 54 to 68° C., and an oil content below 10 wt.-%, preferably below 8 wt.-% and more preferably below 7 wt.-%.

The fractional crystallization according to the invention is not a conventional deoiling process. The aim of the common deoiling process is to remove the predominant proportion of the hydrocarbons that are liquid under normal conditions (oils). In order to obtain a high yield of deoiled wax the oil fraction is reduced to a minimum while the oil content of the oil fraction is adjusted to a maximum. Generally, the size of the oil fraction is below 15 wt.-% and the congealing point of the oil fraction is well below 45° C. In contrast, the fractions obtained by the present invention have a size of at least 19 wt.-% of the initial feed wax and a congealing point of preferably at least 45° C. In the process of the present invention preferably no fractions with a congealing point below 45° C., preferably below 40° C., and/or fractions having an oil content above 10 wt.-%, preferably above 15 wt.-% are produced.

The fractional crystallization process can preferably be conducted in a crystallizer as described in U.S. Pat. No. 6,074,548. Essentially the crystallizer comprises a steel box with a number of vertical cooling/heating plates with large heat transfer surfaces. These plates are cooled or heated by hot or cold water. Raw wax material to be crystallized is introduced from the top in a batch wise process under atmospheric pressure. The feed wax is then cooled until the wax has completely solidified. Next the solid wax is slowly heated to a first temperature at which a first fraction of the wax melts. The first fraction has a congealing point which is lower than the congealing point of the feed wax. During the heating the first fraction melts and can be drained off at the bottom of the crystallizer chamber. This is the most efficient way of conducting the invention and therefore this process is preferred.

The initial feed wax is a hydrocarbon wax which comprises at least 75 wt.-%, preferably 80 wt.-% and more preferably 90 wt.-% of linear alkanes. The composition of the feed wax can be determined by gas chromatography according to the Standard Test Method for Analysis of Hydrocarbon Waxes by Gas Chromatography (EWF Method 001/03) of the European Wax Federation (EWF). Preferably the feed wax comprises >60 wt.-%, more preferably >80 wt.-% and most preferably >95 wt.-% of n-alkanes with chain lengths between 15 and 65 carbon atoms and a molar mass of 200 to 900 g/mol, preferably 250 to 580 g/mol and most preferably 280 to 500 g/mol (n-alkane content and carbon chain length are obtained by EWF method 001/03 and the molar is calculated therefrom).

The initial feed wax preferably has an oil-content of less than 1 wt.-%, more preferably less than 0.5 wt.-%. The oil-content of the feed wax is within the ranges of deoiled and refined paraffin waxes. If not stated otherwise the term "oil-content" as used herein refers to the oil-content determined according to DIN ISO 2908. The oil-content is measured by performing an analytic extraction of the oils with MEK at −32° C. (methyl ethyl ketone, also known as butanone) as solvent and all components extracted by the MEK solvent are defined as oil components.

The initial feed wax preferably is a Fischer-Tropsch-derived wax, i.e. a wax produced by the Fischer-Tropsch (FT) process. In a more preferred embodiment of the invention, the initial feed wax is a Fischer-Tropsch cobalt-derived wax or Fischer-Tropsch iron-derived wax, i.e. a wax produced by a Fischer-Tropsch process employing a cobalt-based Fischer-Tropsch catalyst or an iron-based Fischer-Tropsch catalyst. Most preferably the feed wax is a low-temperature Fischer-Tropsch (LTFT) cobalt-derived wax or high-temperature Fischer-Tropsch (HTFT) iron-derived wax. In particular, the feed wax is wax produced by a gas-to-liquids low-temperature Fischer-Tropsch process employing a cobalt-based catalyst or by a gas-to-liquids high-temperature Fischer-Tropsch process employing an iron-based catalyst.

Both Fischer Tropsch processes, i.e. the LTFT (Low temperature) and the HTFT (High temperature) process using cobalt and iron catalysts, respectively, result in the formation of FT-waxes having a congealing point of 30° C. to 105° C. and a carbon chain length of 15 to 65. The intermediate reactor waxes obtained by these processes are then separated by distillation into different fractions, typically into soft (average molar mass of 280-310 g/mol), medium (average molar mass of 310-500 g/mol) and hard waxes (average molar mass of 580-900 g/mol). These waxes are particularly suitable as feed waxes.

The fractions obtained by distillation of FT waxes are usually not directly interchangeable with petroleum-derived paraffin waxes of the same melting range for several reasons. One reason is their higher content of n-alkanes, another reason is their content of olefins and oxygenates. Furthermore, differences exist in the structure of branched components. It has now surprisingly been found that by subjecting FT-waxes to the process of present invention product waxes can be obtained which meet the specifications of common petroleum-derived paraffin waxes although the chemical composition of FT-waxes and petroleum-derived paraffin waxes differ.

According to a further preferred embodiment of the invention the Fischer-Tropsch wax is hydrotreated and the hydrotreated wax is then used as a feed wax for the process of the present invention. Hydrotreating the FT-wax may be conducted catalytically using any suitable technique known to persons skilled in the art of wax hydrotreating. Typically, the feed FT-wax is hydrotreated using hydrogen at an absolute pressure between about 30 and about 70 bar, e.g. about 50 bar and an elevated temperature between about 150 and about 250° C., e.g. about 220° C. in the presence of a Nickel-catalyst, such as NiSat 310 available from Sued-Chemie SA (Pty) Ltd of 1 Horn Street, Chloorkop, 1624, South Africa.

Hydrotreating of FT-waxes is to be understood as a process in which impurities such as, alcohols or other compounds containing oxygen and unsaturated hydrocarbons such as olefins are converted to alkanes by a catalytic reaction with hydrogen. It does not include cracking reactions such as hydroisomerization or hydrocracking. Although FT-waxes are the preferred feed waxes other paraffin waxes and nonfossil waxes having an n-alkane content of at least 75 wt.-% may be used as well. However, paraffin waxes contain in opposite to FT-waxes aromatic, sulfur and nitrogen compounds. These compounds can be transformed to hydrocarbons by hydrotreating under enhanced conditions such as a hydrogen pressure of 80-150 bar, a temperature of 250-350° C. and at space velocities of 0.3-2 $h^{-1}$. Preferred catalysts which are suitable for hydrotreating paraffin waxes are sulfurized Ni, Mo, W catalysts.

While not wishing to be bound by a particular theory, it is believed that the n-alkane content of the feed wax is a decisive factor. It is assumed that n-alkanes co-crystallize and thereby form a crystal structure which allows their separation into different fractions. It is further assumed that the n-alkanes percentage controls the separation efficiency of the crystallization process and favors the formation of narrower wax fractions with different congealing points compared to the feed wax.

In any case, feed waxes having a congealing point between 40 and 80° C. according to DIN ISO 2207 and more preferably between 54 and 64° C. are particularly preferred.

The process of the present invention results in a graduated separation of alkanes into fractions, preferably into evenly divided fractions, i.e. fractions having about the same size, and provides product waxes which have similar properties as deoiled and refined paraffin waxes obtained from petroleum.

The molten wax phases can be recovered e.g. by collecting the liquid wax at the bottom of the container and discharging the liquid fraction from the container into a suitable vessel. Alternatively, the liquid wax fraction(s) leaving the container can be collected by a fraction collector. According to the present invention the temperature of the solid feed-wax is continuously raised until the feed wax has completely melted.

While it is preferred to separate the initial feed wax into 2 to 5 fractions, it is, however, also possible to use a wax fraction obtained by the above process as a feed wax for further separation, for instance in order to separate a wax fraction into two or more subfractions.

The process of the present invention is preferably operated batch-wise.

A particular advantage of the process of the present invention is that it does not require high temperatures as used e.g. in distillation procedures. Energy consumption and investment costs are comparatively low, and discoloration by thermal stress of the wax is minimized. This allows the processing even of very light feed waxes without color changes. Nevertheless a separation efficiency is achieved which is similar to that of a distillation process.

By the process of the present invention wax products can be obtained which meet industry standard specifications for petroleum-derived commercially acceptable Fully Refined Paraffin (FRP), Semi Refined Paraffin (SRP) and Slack waxes which are summarized in the following Table 1.

TABLE 1

| | | | | | | | | | | |
|---|---|---|---|---|---|---|---|---|---|---|
| Industry standard specifications for paraffin waxes | | | | | | | | | | |
| Parameter | Unit | FRP 56-58 | FRP 58-60 | FRP 60-62 | FRP 62-64 | SRP 54-56 | SRP 56-58 | SRP 58-68 | Slackwax 45-55 | Slackwax 56-64 |
| Congealing point[1] | ° C. | 56-58 | 58-60 | 60-62 | 62-64 | 54-56 | 56-58 | 58-68 | 45-55 | 56-64 |
| Oil content[2] | w/w % | 0-0.5 | 0-0.5 | 0-0.5 | 0-0.5 | 0.5-2 | 0.8-1.5 | 0-2.0 | 3.5-15 | 3.0-5.0 |
| PenN 25° C.[3] | 0.1 mm | 15-19 | 10-19 | 10-16 | 8-17 | 15-30 | 20-26 | 8-12 | 30-70 | 16-30 |
| PenN 40° C.[3] | 0.1 mm | 70-120 | 40-90 | 30-60 | 20-40 | 100-150 | 110-160 | 30-50 | n.a. | 30-100 |
| Density 70° C.[4] | kg/m$^3$ | 765-785 | 765-785 | 770-790 | 775-795 | 765-785 | 770-790 | 770-790 | 775-785 | 770-790 |

TABLE 1-continued

Industry standard specifications for paraffin waxes

| Parameter | Unit | FRP 56-58 | FRP 58-60 | FRP 60-62 | FRP 62-64 | SRP 54-56 | SRP 56-58 | SRP 58-68 | Slackwax 45-55 | Slackwax 56-64 |
|---|---|---|---|---|---|---|---|---|---|---|
| Viscosity 100° C.[5] | mm²/s | 3-5 | 3.5-5 | 4-5.7 | 4.5-5.5 | 3-4.5 | 3.5-5 | 3.8-5.2 | 3-6 | 3-5 |

[1] determined according to DIN ISO 2207
[2] determined according to DIN ISO 2908
[3] needle penetration (PenN) determined according to DIN 51579
[4] determined according to DIN EN ISO 12185
[5] determined according to ASTM D 7042

The size of the wax fractions obtained by the process of the invention is preferably selected such that the flash point of the first fraction is preferably at least 3° C., more preferably at least 6° C. lower than the flash point of the initial feed wax, and the flash point of the last fraction is preferably at least 3° C., more preferably at least 6° C. higher than the flash point of the initial feed wax. If not stated otherwise the term "flash point" refers to the flash point determined according to ASTM D92.

In addition, the size of the wax fractions obtained by the process of the invention is preferably selected such that the viscosity at 100° C. of the first fraction is preferably not more than 0.3 mm²/s lower than the viscosity at 100° C. of the initial feed wax, and the viscosity at 100° C. of the last fraction is preferably not more than 0.8 mm²/s higher than the viscosity at 100° C. of the initial feed wax. If not stated otherwise the term "viscosity" refers to the viscosity determined according to ASTM D7042.

In addition, the size of the wax fractions obtained by the process of the invention is preferably selected such that the needle penetration at 25° C. of the first fraction is preferably not more than 6.0 1/10 mm higher than the needle penetration at 25° C. of the initial feed wax composition, and the needle penetration at 25° C. of the last fraction is preferably not more than 16.0 1/10 mm, more preferably not more than 5.0 1/10 mm, lower than the needle penetration at 25° C. of the initial feed wax. If not stated otherwise the term "needle penetration" refers to the penetration determined according to DIN 51579.

In addition, the size of the wax fractions obtained by the process of the invention is preferably selected such that the needle penetration at 40° C. of the first fraction is preferably not more than 100.0 1/10 mm higher than the penetration at 40° C. of the initial feed wax, and the penetration at 40° C. of the last fraction is preferably not more than 65.0 1/10 mm, more preferably not more than 30.0 1/10 mm, lower than the penetration at 40° C. of the initial feed wax.

In the following the invention will be further explained by examples.

EXAMPLES

Example 1

Separating Feed Waxes into Three Fractions

Two feed waxes, a hydrotreated Fischer Tropsch derived wax (Sasolwax M5, hydrotreated and deoiled) and a fully refined crude petroleum-derived paraffin wax with a congealing point of 58-60° C. (Sasolwax 5803), both with an n-alkanes content of above 75 wt.-% and an oil-content according to DIN ISO 2908 of below 1 wt.-% were fractionated by crystallization into three different wax fractions with 33 wt.-%. The characteristics of the feed waxes are summarized in Table 2.

TABLE 2

Properties of feed waxes

| Parameters | Unit | Feed wax 1 (hydrotreated + deoiled FT-wax) Sasolwax M5 | Feed wax 2 (FRP 58-60) Sasolwax 5803 |
|---|---|---|---|
| Congealing point DIN ISO 2207 | ° C. | 59.0 | 59.0 |
| Oil content DIN ISO 2908 | w/w % | 0.43 | 0.45 |
| PenN[1] 25° C. DIN 51579 | 0.1 mm | 12 | 15 |
| PenN[1] 40° C. DIN 51579 | 0.1 mm | 48 | 57 |
| Density 70° C. DIN EN ISO 12185 | kg/m³ | 756.3 | 776.1 |
| Viscosity 100° C. ASTM D7042 | mm²/s | 3.9 | 4.3 |
| Flash point (COC) ASTM D92 | ° C. | 235 | 247 |
| Sulphur content | ppm | 4.1 | 11.0 |
| Saybolt Color ASTM D156 | — | 8 | 30 |
| n-alkanes content[2] | % | 96.1 | 78.3 |
| i-alkanes content[2] | % | 3.9 | 21.7 |

[1] needle penetration
[2] determined by gas chromatography according to EWF Method 001/03

Fractional crystallization was conducted in a 6 liter laboratory crystallizer comprising an insulated double jacket steel pipe which was provided with steel rings in its inside. The crystallizer was separately charged with of 5 kg of each feed wax. The temperature was adjusted according to the profile shown in Table 3; temperature was controlled by a thermostat filled with water. Fractions were collected with an automatic sampling system.

TABLE 3

Temperature profile of fractional crystallization

| | Time [min] | Σ Time [min] | Temperature [° C.] |
|---|---|---|---|
| Filling | 10 | 10 | 70 |
| Cooling | 240 | 250 | 49 |
| Holding | 60 | 310 | 49 |
| Melting | 483 | 796 | 70 |

Feed wax 1 (hydrotreated and deoiled FT-wax) was separated into three 33.3% fractions. The properties of these fractions are shown in Table 4. The first fraction had an oil-content of 1.19% and a congealing point (CP) of 55.5° C. It meets the industry standard of a semi-refined paraffin wax (SRP 54-56; see Table 1). The second fraction had an oil-content of 0.4% and a congealing point of 57.5° C., and the third fraction had an oil-content of 0.18% and a congealing point of 63.0° C. These fractions meet the industry standard of fully refined paraffin waxes of grade FRP 58-60 and FRP 62-64, respectively (see Table 1).

TABLE 4

Properties of fractions obtained from Feed wax 1

| Fraction | % | CP [° C.] | Oil-cont. [%] | PenN 25 [0.1 mm] | PenN 40 [0.1 mm] | n-alkanes [%] | Viscosity [mm$^2$/s] | FP [° C.] | Corresponds to |
|---|---|---|---|---|---|---|---|---|---|
| Feed wax 1 | 100 | 59.0 | 0.43 | 12 | 48 | 96.0 | 3.9 | 235 | FRP 58-60 |
| 1 | 33.3 | 55.5 | 1.19 | 18 | 146 | 95.7 | 3.6 | 219 | SRP 54-56 |
| 2 | 33.3 | 57.5 | 0.40 | 12 | 72 | 96.2 | 3.9 | 227 | FRP 58-60 |
| 3 | 33.3 | 63.0 | 0.18 | 9 | 25 | 96.8 | 4.6 | 251 | FRP 62-64 |

Table 4 shows that Fraction 3 has a much higher flash point (FP) than the feed wax. This is an additional advantageous because the flash point is an important parameter for high-temperature applications because fire hazard is reduced.

Feed wax 2 (FRP 58-60) was also separated into three 33.3% fractions. The compositions of these fractions are shown in Table 5. The first fraction had an oil-content of 0.78% and a congealing point (CP) of 56.5° C. It meets the industry standard of a semirefined paraffin wax (SRP 54-56; see Table 1). The second fraction had an oil-content of 0.18% and a congealing point of 58.5° C., and the third fraction had an oil-content of <0.1% and a congealing point of 62.0° C. These fractions meet the industry standard of fully refined paraffin waxes of grade FRP 58-60 and FRP 62-64, respectively (see Table 1).

TABLE 5

Properties of fractions obtained from Feed wax 2

| Fraction | % | CP [° C.] | Oil-cont. [%] | PenN 25 [0.1 mm] | PenN 40 [0.1 mm] | N-alkanes [%] | Viscosity [mm$^2$/s] | FP [° C.] | Corresponds to |
|---|---|---|---|---|---|---|---|---|---|
| Feed wax 2 | 100 | 59.0 | 0.45 | 15 | 57 | 78.3 | 4.3 | 247 | FRP 58-60 |
| 1 | 33.3 | 56.5 | 0.78 | 20 | 152 | 72.8 | 4.2 | 245 | SRP 56-58 |
| 2 | 33.3 | 58.5 | 0.18 | 14 | 62 | 78.3 | 4.4 | 248 | FRP 58-60 |
| 3 | 33.3 | 62.0 | <0.1 | 11 | 29 | 83.9 | 4.5 | 250 | FRP 62-64 |

Example 2

Separating Feed Waxes into Two Fractions

In analogy to Example 1 feed waxes 1 and 2 were separated into two 50 wt.-% fractions. The composition of the fractions is shown in the following tables 6 and 7. Feed wax 1 gave a first fraction which meets the industry standard of a semi-refined paraffin wax (SRP 54-56) and a second fraction which meets the standard of a fully refined paraffin wax (FRP 60-62). Feed wax 2 gave two fractions which both correspond to the industry standard of fully refined paraffin wax (FRP 56-58 and FRP 60-62).

TABLE 6

Separation of Feed 1 into two fractions by fractional crystallization

| Fraction | % | CP [° C.] | Oil-cont. [%] | PenN 25 [0.1 mm] | PenN 40 [0.1 mm] | n-alkanes [%] | Viscosity [mm$^2$/s] | FP [° C.] | Corresponds to |
|---|---|---|---|---|---|---|---|---|---|
| Feed 1 | 100 | 59.0 | 0.43 | 12 | 48 | 96.0 | 3.9 | 235 | FRP 58-60 |
| 1 | 50 | 56.0 | 0.98 | 16 | 127 | 95.8 | 3.6 | 222 | SRP 54-56 |
| 2 | 50 | 61.5 | 0.29 | 11 | 51 | 96.6 | 4.2 | 242 | FRP 60-62 |

TABLE 7

Separation of Feed 2 into two fractions by fractional crystallization

| Fraction | % | CP [° C.] | Oil-cont. [%] | PenN 25 [0.1 mm] | PenN 40 [0.1 mm] | n-alkanes [%] | Viscosity [mm²/s] | FP [° C.] | Corresponds to |
|---|---|---|---|---|---|---|---|---|---|
| Feed 2 | 100 | 59.0 | 0.45 | 15 | 57 | 78.3 | 4.3 | 247 | FRP 58-60 |
| 1 | 50 | 57.0 | 0.56 | 18 | 119 | 74.7 | 4.4 | 247 | FRP 56-58 |
| 2 | 50 | 61.0 | <0.1 | 11 | 31 | 82.5 | 4.6 | 250 | FRP 60-62 |

Example 3

Fractionation of Unhydrotreated FT Wax

Unhydrotreated Sasolwax M5 (Feed Wax 3) was subjected to the crystallization process of Example 2. Two fractions of 50 wt.-% were isolated. The first fraction had a congealing point of 49.5° C. and an oil-content of 6.7%. It meets the industry standard of a slack wax (Slackwax 45-55; Table 9). The second fraction had a congealing point of 65.0° C. and an oil-content of 0.9%, it meets the industry standard of a semi-refined paraffin wax (SRP 58-68; Table 9). This example shows that even feed waxes with comparatively high oil content can be fractionated by the crystallization process of the present invention.

TABLE 8

Properties of fractions obtained from Feed wax 3

| Fraction | % | CP [° C.] | Oil-cont. [%] | PenN 25 [0.1 mm] | PenN 40 [0.1 mm] | n-alkanes [%] | Viscosity [mm²/s] | Corresponds to |
|---|---|---|---|---|---|---|---|---|
| Feed wax 3 | 100 | 57.5 | 3.4 | 27 | 98 | 80.5 | 3.4 | Slackwax 56-64 |
| 1 | 50 | 49.5 | 6.7 | nd | nd | 64.1 | 3.1 | Slackwax 45-55 |
| 2 | 50 | 65.0 | 0.9 | 11 | 33 | 85.8 | 4.2 | SRP 58-68 | nd: not determined

The invention claimed is:

1. A process for obtaining wax fractions from an initial feed wax, the process comprising:
   (a) providing a molten feed wax in a container;
   (b) solidifying the feed wax by cooling;
   (c) increasing the temperature of the feed wax to a temperature at which a first fraction of the feed wax melts;
   (d) recovering the first fraction of the feed wax, said first fraction having a congealing point which is lower than the congealing point of the feed wax;
   (e) increasing the temperature of the remaining feed wax to a temperature at which a further fraction of the feed wax melts; and
   (f) recovering the further fraction of the feed wax;
   characterized in that the feed wax comprises at least 75 wt.-% of linear alkanes and the feed wax has an oil-content of less than 0.5 wt.-%, that the first fraction recovered in step (d) comprises 19 to 81 wt.-% of the feed wax, and wherein step (e) the temperature is increased to a temperature which is below a final melting temperature of the remaining feed wax and wherein steps (e) and (f) are repeated 1 to 3 times and wherein in the final repetition of step (e) the remaining feed wax is melted completely.

2. The process of claim 1, wherein the feed wax is separated into 2 fractions, each fraction comprising from 20 to 80 wt.-% of the initial feed wax, provided that the sum of the fractions is 100 wt.-%.

3. The process of claim 1, wherein the feed wax is separated into 5 fractions, each fraction comprising 19 to 24 wt.-% of the initial feed wax, provided that the sum of the fractions is 100 wt.-%.

4. The process of claim 1, wherein the feed wax is separated into 4 fractions, each fraction comprising from 20 to 40 wt.-% of the initial the feed wax, provided that the sum of the fractions is 100 wt.-%.

5. The process of claim 1, wherein the feed wax is separated into 3 fractions, each fraction comprising from 20 to 60 wt.-% of the initial feed wax, provided that the sum of the fractions is 100 wt.-%.

6. The process of claim 1, wherein the feed wax comprises >60 wt.-% of n-alkanes with chain lengths between 15 and 65 carbon atoms and a molar mass of 200 to 900 g/mol.

7. The process of claim 1, wherein the feed wax has a congealing point between 40 and 80° C.

8. The process of claim 1, wherein the feed wax is a wax produced by a Fischer-Tropsch-process.

9. The process of claim 1, wherein in steps (c) and (e) the temperature of the wax is increased at a rate of from 0.5 to 3° C. per hour.

10. The process of claim 1, wherein starting at step (c) the temperature is continuously increased throughout the process until the final recovering step (f).

11. The process of claim 1, wherein the fractional crystallization is conducted in a crystallizer comprising a steel box with a number of vertical cooling/heating plates.

12. The process of claim 1, wherein the congealing point of all obtained wax fractions is between 45 to 80° C. and the oil content is below 10 wt.-%.

13. The process of claim 1, wherein the flash point of the final fraction is at least 3° C. higher than the flash point of the initial feed wax, and the flash point of the first fraction is at least 3° C. lower than the flash point of the initial feed wax.

14. The process of claim 1, wherein the viscosity at 100° C. of the first fraction is not more than 0.3 mm$^2$/s lower than the viscosity at 100° C. of the initial feed wax, and the viscosity at 100° C. of the final fraction is not more than 0.3 mm$^2$/s higher than the viscosity at 100° C. of the initial feed wax.

15. The process of claim 1, wherein the needle penetration at 25° C. of the first fraction is not more than 6.0 1/10 mm higher than the penetration at 25° C. of the initial feed wax composition, and the penetration at 25° C. of the final fraction is not more than 16.0 1/10 mm lower than the penetration at 25° C. of the initial feed wax; and/or
　　wherein the needle penetration at 40° C. of the first fraction is not more than 100.0 1/10 mm higher than the penetration at 40° C. of the initial feed wax, and the penetration at 40° C. of the final fraction is not more than 65.0 1/10 mm lower than the penetration at 25° C. of the initial feed wax.

16. A wax obtained by the process of claim 1.

17. The process of claim 2, wherein each fraction comprises 40 to 60 wt.-% of the initial feed wax.

18. The process of claim 17, wherein each fraction comprises about 50 wt.-% of the initial feed wax.

19. The process of claim 1, wherein the feed wax is separated into at least two different refined paraffin wax fractions.

20. The process of claim 19, wherein the final fraction has a flash point at least 3° C. higher than the initial feed wax flash point, and the first fraction flash point is at least 3° C. lower than the flash point of the initial feed wax.

21. The process of claim 19, wherein viscosity at 100° C. of the first fraction is not more than 0.3 mm$^2$/s lower than viscosity at 100° C. of the initial feed wax, and viscosity at 100° C. of the final fraction is not more than 0.3 mm$^2$/s higher than the viscosity at 100° C. of the initial feed wax.

22. The process of claim 19, wherein needle penetration at 25° C. of the first fraction is not more than 6.0 1/10 mm higher than needle penetration at 25° C. of the initial feed wax composition, and needle penetration at 25° C. of the final fraction is not more than 16.0 1/10 mm lower than needle penetration at 25° C. of the initial feed wax;
　　and/or
　　wherein needle penetration at 40° C. of the first fraction is not more than 100.0 1/10 mm higher than needle penetration at 40° C. of the initial feed wax, and needle penetration at 40° C. of the final fraction is not more than 65.0 1/10 mm lower than needle penetration at 25° C. of the initial feed wax.

23. The process of claim 19, wherein congealing point of the first fraction and congealing point of the final fraction differ at least 2° C. from the initial feed wax congealing point.

24. The process of claim 23, wherein the congealing point of the first fraction is at least 2° C. lower than the congealing point of the initial feed wax and the congealing point of the final fraction is at least 2° C. higher than the congealing point of the initial feed wax.

25. The process of claim 19, wherein the first fraction has a lower concentration of n-alkanes than the feed wax and the last fraction has a higher concentration of n-alkanes than the feed wax.

26. The process of claim 19, wherein at least two different refined paraffin wax fractions have congealing points, determined according to DIN ISO 2207, of between 54 to 68° C. and wherein at least one refined paraffin wax fraction has a congealing point of between 56 to 64° C.

27. The process of claim 19, wherein at least two different refined paraffin wax fractions meet the industry standard specifications for Fully Refined Paraffin 56-58, Fully Refined Paraffin 58-60, Fully Refined Paraffin 60-62, and/or Fully Refined Paraffin 62-64.

* * * * *